United States Patent
Atsumi

(10) Patent No.: US 7,161,761 B2
(45) Date of Patent: Jan. 9, 2007

(54) MAGNETIC DISK DRIVE WITH FEEDBACK CONTROL

(75) Inventor: Takenori Atsumi, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/083,887

(22) Filed: Mar. 18, 2005

(65) Prior Publication Data

US 2005/0207057 A1    Sep. 22, 2005

(30) Foreign Application Priority Data

Mar. 19, 2004    (JP) .............................. 2004-079735

(51) Int. Cl.
    *G11B 5/596* (2006.01)
(52) U.S. Cl. ................................. 360/78.09
(58) Field of Classification Search ............ 360/78.09, 360/78.06, 78.04, 69, 75; 710/5; 714/807
    See application file for complete search history.

(56) References Cited

U.S. PATENT DOCUMENTS

| | | | |
|---|---|---|---|
| 6,314,473 B1* | 11/2001 | Singer et al. ................... 710/5 |
| 6,560,658 B1* | 5/2003 | Singer et al. ................... 710/5 |
| 6,609,226 B1* | 8/2003 | Figueira ....................... 714/807 |
| 6,961,205 B1* | 11/2005 | Atsumi et al. ............ 360/78.06 |
| 2002/0041459 A1* | 4/2002 | Singer et al. ................. 360/69 |
| 2003/0147172 A1* | 8/2003 | Singer et al. ............. 360/78.04 |

FOREIGN PATENT DOCUMENTS

| | | |
|---|---|---|
| JP | 03-233609 | 10/1991 |
| JP | 05-143165 | 6/1993 |
| JP | 2000-123502 | 4/2000 |

* cited by examiner

*Primary Examiner*—Fred F. Tzeng
(74) *Attorney, Agent, or Firm*—Townsend and Townsend and Crew LLP; Darren Gold

(57) ABSTRACT

A feedforward control system using a polynomial formula not affected by discretization error is realized in a magnetic disk drive. In one embodiment, the magnetic disk drive is intended to move a head for performing at least one of recording and playback to and from a magnetic recording medium to a target position. The feedforward input has a seek control system computed by a polynominal formula of a time function. The coefficients of the polynomial formula have been derived from boundary conditions including the characteristics of a zero-order hold.

20 Claims, 5 Drawing Sheets

MAGNETIC DISK DRIVE WITH FEEDBACK CONTROL

CROSS-REFERENCES TO RELATED APPLICATIONS

This application claims priority from Japanese Patent Application No. JP2004-079735, filed Mar. 19, 2004, the entire disclosure of which is incorporated herein by reference.

BACKGROUND OF THE INVENTION

The present invention relates to a magnetic disk drive and, more particularly, to a magnetic disk drive adapted to move a magnetic head to a target track.

A magnetic disk drive that is a storage device external to a computer has a magnetic head that moves to a target track on a surface of a rotating magnetic disk to perform recording and playback of data.

Generally, a following control system for causing a magnetic head to keep track of the same track to read and write data, a seek control system for moving the magnetic head to a target track where data is present, and a settling control system for performing a splice from the seek control system to the following control system near the target track are present in a magnetic head positioning control system.

In the seek control system, at relatively short seek spans, the control input does not saturate during acceleration. Also, the upper limit of the moving velocity is not exceeded. Therefore, a two-degree-of-freedom control system using a smooth acceleration trajectory relying on a time function can be applied. In this two-degree-of-freedom control system, vibrations produced during a seek operation can be suppressed. Another advantage is that a position feedback system having good error rejection characteristics can be used.

In the two-degree-of-freedom control system relying on a time function, a target acceleration given as a feedforward control input and a method of how the target position or target velocity is given to the feedback system are important design components.

In JP-A-2000-233609 (Patent Reference 1), a method of realizing a target acceleration by a time function of the third order is disclosed. In this method, the target velocity is derived as a quartic function obtained by integrating a time function used in the target acceleration. The target position is derived as a quintic equation obtained by integrating a velocity trajectory.

In JP-A-5-143165 (Patent Reference 2), a method of realizing a velocity trajectory by a time function of the fifth order is disclosed. At this time, the target acceleration trajectory is derived from a quartic function obtained from differentiating the velocity trajectory. The target position is derived from a sextic function obtained by integrating the velocity trajectory.

In JP-A-123502 (Patent Reference 3), a method is disclosed in which a target acceleration is taken as a sine wave where the time is an input. The velocity trajectory is realized by integration of the acceleration trajectory. The position trajectory is realized by integration of the velocity trajectory.

BRIEF SUMMARY OF THE INVENTION

In these well-known examples, the target velocity is derived provided that the target acceleration has been integrated in a continuous time system. The target position is derived provided that the target velocity has been integrated in the continuous time system (the target acceleration has been integrated twice in the continuous time system). However, the head positioning control system in the actual magnetic disk drive is a sampled data control system having a sampler (A/D converter) and a hold (D/A converter). Generally, a zero-order hold for holding the value on a sample point for a sampling time is used for the hold.

Where the zero-order hold is used as a D/A converter, discretization error is produced between the value of a time function given as a target acceleration and a feedforward control input actually given as an reference value. Therefore, the target velocity and target position shown in the above-described well-known examples are calculated based on integration of a time function that is a target acceleration and so the effects of the discretization error are not taken into consideration. Errors are produced with actual velocity trajectory and positional trajectory.

Therefore, with the aforementioned methods, it is difficult to reach the target value without errors only with a feedforward input. Furthermore, these errors are inputted into a feedback controller as tracking errors. This causes a deterioration of the transient response of the control system and an increase of the seek time.

The present invention is intended to realize a target acceleration used during a seek operation by a polynomial formula in which discretization errors due to zero-order hold do not take place.

Embodiments of the present invention provide a magnetic disk drive for moving a magnetic head to a target position, the head performing at least one of recording and playback to and from a magnetic recording medium. The magnetic disk drive has a seek control system in which a feedforward input is calculated with a polynomial formula of a time function. Coefficients of the polynomial formula have been derived from boundary conditions including characteristics of a zero-order hold.

According to the present invention, a target acceleration used during a seek operation can be realized by a polynomial formula in which discretization errors due to zero-order hold do not take place.

DETAILED DESCRIPTION OF THE INVENTION

One embodiment of the present invention is hereinafter described with reference to the drawings.

Figure 1:
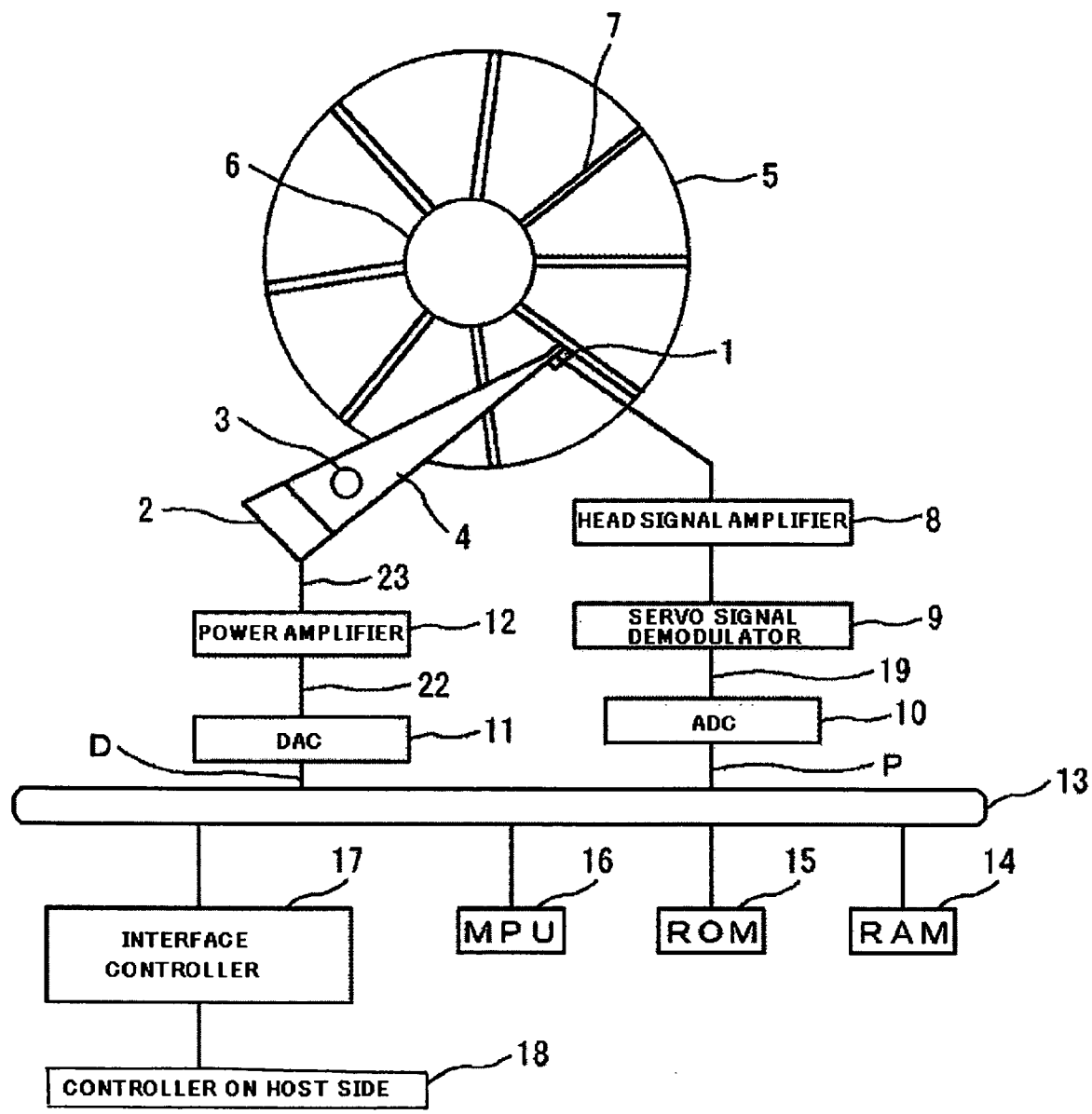
FIG. 1 is a structural diagram of a head positioning control system of a magnetic disk drive showing one embodiment of the present invention.

FIG. 1 is a schematic diagram of the head positioning control system of a magnetic disk drive of one embodiment of the present invention. A magnetic disk 5 that is a recording medium is fixed to a spindle motor 6. It is rotating at a determined rotational speed. Furthermore, a pivot bearing 3 is mounted at a side of the magnetic disk 5 held to the spindle motor 6 and parallel to the axis of the spindle motor. A carriage 4 is swingably fixed to the pivot bearing 3. A magnetic head 1 is fixed to the front end of the carriage 4. Power for moving the magnetic head 1 is produced by a voice coil motor (hereinafter referred to as the VCM) 2. The magnetic head 1 can know the present position by detecting a position signal recorded on a servo sector 7 on the magnetic disk. The position signal detected by the magnetic head is amplified by a head signal amplifier 8 and demodulated by a servo signal demodulator 9. The demodulated servo signal 19 becomes a position signal P via an A/D converter (ADC) 10, and is accepted into an MPU 16 via a bus 13. The head position signal P obtained in this way is processed by the MPU 16. A VCM control signal D is created by the following method.

A ROM 15 and a RAM 14 are provided for the MPU 16 via the bus 13. Various kinds of control programs including the present embodiment executed by the MPU 16 are stored in the ROM 15. Parameters necessary for various kinds of controls are also stored. An interface controller 17 is connected with the MPU 16 via the bus 13, and issues a Read/Write access request to the MPU 16 in response to a command of a controller 18 on the host side. When a command (seek command) for requesting reading/writing of data is issued, the MPU 16 implements a positioning method recorded in the ROM 15 and creates an optimum VCM control signal D according to the distance from the present head position P to a target track Ref. The created VCM control signal D becomes a power amplifier control signal 22 via a D/A converter (DAC) 11 as shown in FIG. 1. The signal is converted into an electrical current 23 via a power amplifier 12 and applied to the VCM 2. The VCM 2 produces a force for driving a head actuator and places the magnetic head 1 in position, i.e., the target position.

An operation method regarding the magnetic disk drive of the present embodiment has been described so far. Regarding the positioning method for creating the VCM control signal D based on the difference between the head position signal P indicating the aforementioned present position and the target track Ref, the configuration of the positioning control method according to the present embodiment is described in detail in the following.

Figure 2:
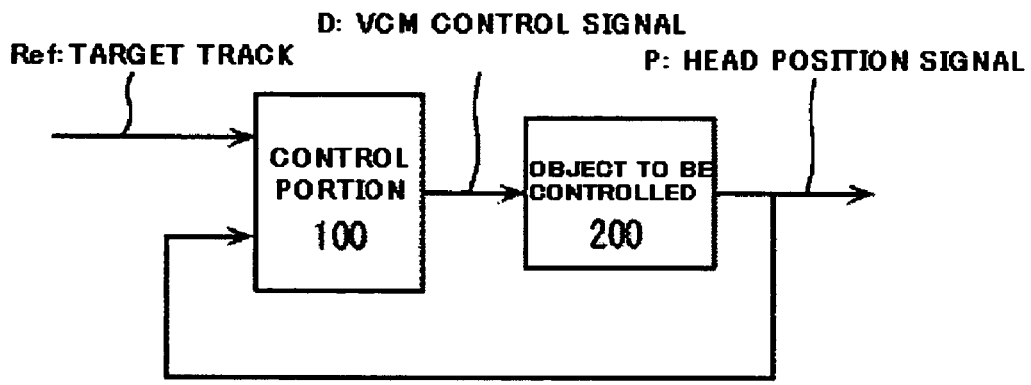
FIG. 2 is a block diagram showing an example of configuration of the head positioning control system in the magnetic disk drive of the present embodiment.

FIG. 2 is a block diagram showing an example of configuration of the head positioning control system in the magnetic disk drive of the present embodiment. This is realized by the processing of the MPU 16 described in FIG. 1. In FIG. 2, an object 200 to be controlled takes the VCM control signal D calculated by the MPU 16 of FIG. 2 as an input, and indicates the transfer characteristics until the track position on the magnetic head 1 is digitized and outputted as the position signal P. On the other hand, the position signal P indicating the target track Ref at which data is read or written and the present head position is inputted into a control portion 100. Based on these input values, the VCM control signal D for positioning the magnetic head 1 in position is computed and applied to the VCM 2. In the present embodiment, the sampling period of the head position signal P and the input period of the VCM control signal D are assumed to be τ seconds.

Figure 3:
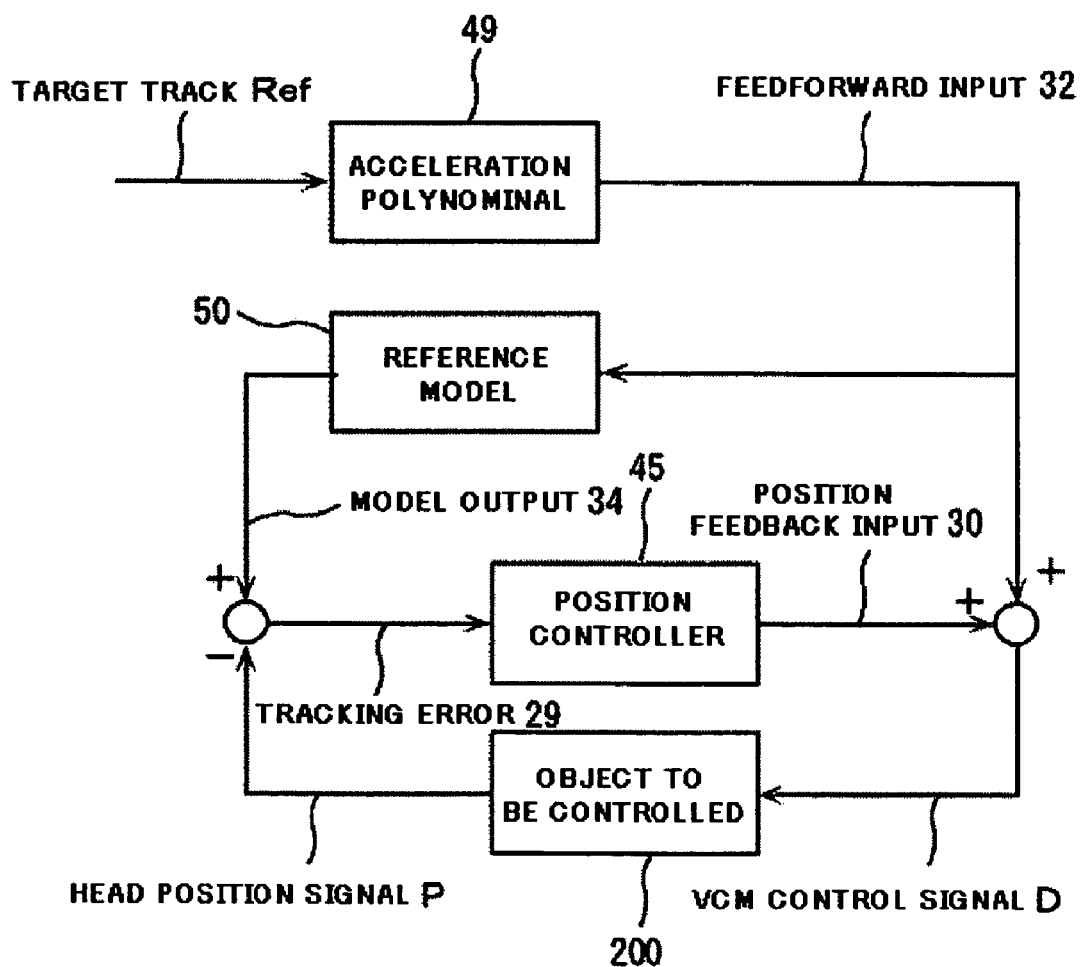
FIG. 3 is a block diagram of the positioning control system of the present embodiment.

FIG. 3 shows a block diagram of the positioning control system of the present embodiment. The target track Ref is inputted to an acceleration polynominal formula 49. The acceleration polynominal formula 49 calculates a feedforward input 32 based on seek movement distance Pt [m] corresponding to the target track Ref, target seek time N [samples], and time n [samples] from the start of the seek.

A method of deriving the acceleration polynomial formula 49 is described. In the head positioning control system of the magnetic head apparatus, it can be assumed that the characteristic possessed by the object to be controlled is a rigid-body model. Where it is assumed that the position is p [m], the velocity is v [m/s], and the input is u [m/s²], the state equation of the rigid-body model in a continuous time system is given by the following Eq. (1).

$$\frac{d}{dt}\begin{bmatrix} p(t) \\ v(t) \end{bmatrix} = \begin{bmatrix} 0 & 1 \\ 0 & 0 \end{bmatrix}\begin{bmatrix} p(t) \\ v(t) \end{bmatrix} + \begin{bmatrix} 0 \\ 1 \end{bmatrix}u(t) \quad (1)$$

Where the rigid-body model is discretized using the zero-order hold of the sampling time τ[s], the state equation is given by the following Eq. (2).

$$\begin{bmatrix} p[k+1] \\ v[k+1] \end{bmatrix} = \begin{bmatrix} 1 & \tau \\ 0 & 1 \end{bmatrix}\begin{bmatrix} p[k] \\ v[k] \end{bmatrix} + \begin{bmatrix} \frac{1}{2}\tau^2 \\ \tau \end{bmatrix}u[k] \quad (2)$$

From Eq. (2), in a case where input u is applied during the interval from time 0[samples] to n−1 [samples], the velocity v [n] at time n [samples] is given by the following Eq. (3).

$$v[n] = \tau\sum_{i=0}^{n-1} u[i] + v[0] \quad (3)$$

The position p [n] at time n [samples] is given by the following Eq. (4).

$$p[n] = \frac{1}{2}\tau^2\sum_{i=0}^{n-1} u[i] + \tau\sum_{i=0}^{n-1} v[i] + p[0] \quad (4)$$

Here, the acceleration polynomial formula 49 is defined to be a function facc of the number of samples n, and we set u [n]=facc [n]. Where the order of the polynominal formula facc is the fourth order, the polynominal formula facc can be given by the following Eq. (5) by the use of undetermined coefficients A, B, C, D, and E.

$$facc[n]=An^4+Bn^3+Cn^2+Dn+E \quad (5)$$

Here, the boundary conditions are assumed to be given by the following Eq. (6).

p[0]=0, v[0]=0, u[0]=0, p[N]=P$_t$, v[N]=0, u[N]=0, u'[N]=0 \quad (6)

Then, the undetermined multipliers of Eq. (5) are uniquely determined, and the polynomial formula facc is formulated as the following Eq. (7).

$$facc = -\frac{60n(n-N)^2(5nN-2(1+N^2))P_t}{(4-N^2-4N^4+N^6)\tau^2} \quad (7)$$

Assuming that the order of the polynominal formula facc is the fifth order, the boundary conditions are given by the following Eq. (8).

p[0]=0, v[0]=0, u[0]=0, u'[0]=0, p[N]=P_t, v[N]=0,
u[N]=0, u'[N]=0                                    (8)

In this case, the polynominal formula facc is formulated into the following Eq. (9):

$$facc = -\frac{420n^2(n-N)^2(2n-N)P_t}{N(20-21N^2+N^6)\tau^2} \quad (9)$$

Assuming that the order of the polynomial formula facc is the sixth order, the boundary conditions are given by the following Eq. (10).

p[0]=0, v[0]=0, u[0]=0, u'[0]=0, p[N]=P_t, v[N]=0,
u[N]=0, u'[N]=0, u''[N]=0                          (10)

In this case, the polynomial formula facc is formulated into the following Eq. (11).

$$facc = \frac{840n^2(n-N)^3(-10+(7n-3N)N(1+N^2))P_t}{N(N^2-4)(N^2-1)(N^2+5)(10+3(N^2+N^4))\tau^2} \quad (11)$$

Assuming that the order of the polynomial formula facc is the seventh order, the boundary conditions are given by the following Eq. (12).

p[0]=0, v[0]=0, u[0]=0, u'[0]=0, u''[N]=0 p[N]=P_t,
v[N]=0, u[N]=0, u'[N]=0, u''[N]=0                  (12)

In this case, the polynomial formula facc is formulated into the following Eq. (13).

$$facc = \frac{2520n^3(n-N)^3(2n-N)P_t}{N(168-190N^2+21N^4+N^8)\tau^2} \quad (13)$$

That is, where the order of the polynominal formula facc is set to n, the polynominal formula facc can be formulated provided that (n+3) independent boundary conditions are set.

Figure 4:
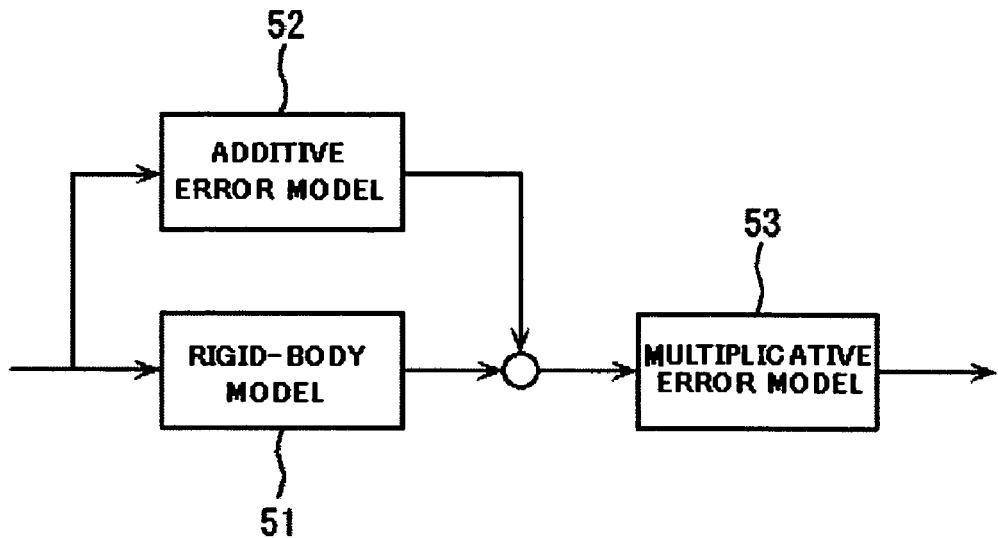
FIG. 4 is a block diagram of a reference model of the present embodiment.

The feedforward input 32 calculated by the acceleration polynomial formula 49 is inputted to the reference model 50. An example of a method of constituting the reference model 50 is shown in FIG. 4. It is assumed that the reference model 50 has characteristics containing a rigid-body model 51 and modelization errors existing between the controlled object 200 and the rigid-body model 51. The modelization errors are separated into additive error 52 and multiplicative error 53. The model is so designed that no integration characteristics are contained in their respective characteristics. Where the modelization error between the controlled object 200 and the rigid-body model 51 is small, the reference model 50 may consist only of the rigid-body model 51. The modelization error may consist only of a multiplicative error model. Also, the modelization error may consist only of an additive error model.

Where the transfer characteristic from the input signal to the output signal is represented by a pulse transfer function, the rigid-body model can be represented as the following Eq. (14).

$$\frac{1}{2}\tau^2 \cdot \frac{z+1}{z^2-2z+1} \quad (14)$$

In the head positioning system of the hard disk apparatus, its mechanism characteristics can be represented by the sum of a rigid-body mode and a resonant mode. Accordingly, in the present embodiment, it is assumed that an additive error model is represented by a pulse transfer function $P_{ae}[z]$ indicating one resonant mode. Where it is assumed that the resonant frequency is ωn[rad/s], the viscosity coefficient is ζ, and the mode constant is κ, $P_{ae}[z]$ is derived as in the following Eq. (15) provided that the transfer function $P_{mr}(s)$ in a continuous time system has been discretized by the zero-order hold of sampling period τ.

$$P_{ms}(s) = \frac{\kappa}{s^2-2\zeta\omega_n+\omega_n^2} \quad (15)$$

At this time, it is desired that the additive error model can reproduce the transfer characteristics of the resonant mode possessed by the controlled object up to the vicinities of a frequency corresponding to the reciprocal of the assumed shortest seek time (probably, the seek time of 1 track). In addition, the attenuation coefficient preferably has a large value (e.g., more than 0.1) such that the transient response of the additive error model itself decreases. In the head positioning system, program calculations involve dead times. Also, the circuitry has phase delay and so on. In the present embodiment, these are regarded as multiplicative errors and a multiplicative error model is designed. The multiplicative error model can be realized by approximating a transfer function of a dead time element by a rational function as in the following Eq. (16) and discretizing its continuous system transfer characteristic by bilinear transform or the like.

$$e^{-T_d s} \quad (16)$$

where Td [s] means an equivalent dead time and corresponds to a delay element produced by other than the characteristic of the mechanism system. In the present embodiment, a first-order Pade approximation is used as a method of making an approximation by a rational function.

Furthermore, it is assumed that the initial value of the quantity of state used in the reference model is so determined as to reflect the state of the controlled object at the start of the seek.

A position controller 45 shown in FIG. 3 is composed of a following compensator to realize desirable control performance that is well known in magnetic disk drive. Tracking error 29 that is the deviation between model output 34 and head position signal P is taken as an input. A position feedback input 30 that decreases the deviation is outputted.

The VCM control signal D becomes the sum of the feedforward input 32 and the position feedback input 30. Here, in a case where the VCM control signal D is not an instructed acceleration value (e.g., a voltage applied to the VCM or the like), the product of the sum of the feedforward input 32 and the position feedback input 30 and the conversion gain becomes the VCM control signal D.

Figure 5A:
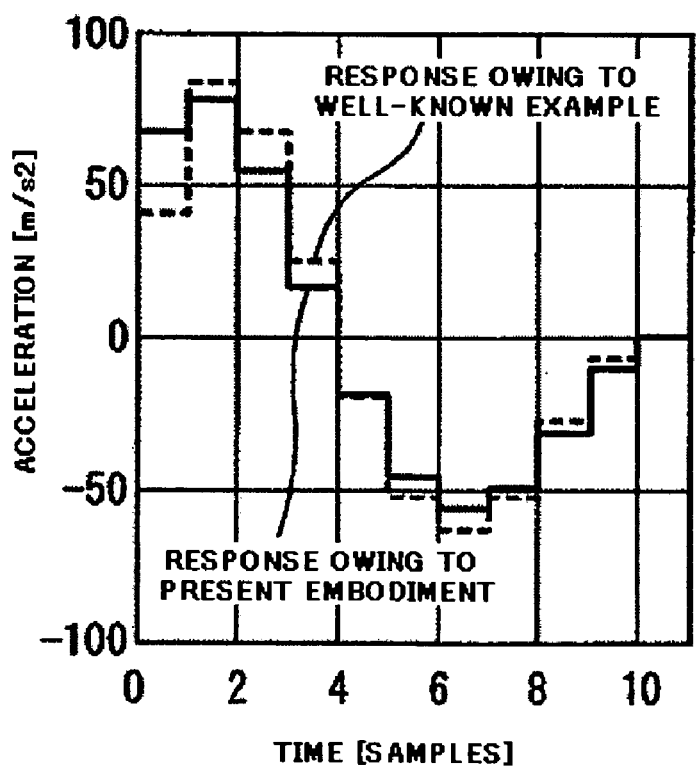
FIG. 5A is a diagram showing acceleration signals given as feedforward inputs in the present embodiment and well-known technique.
Figure 5B:
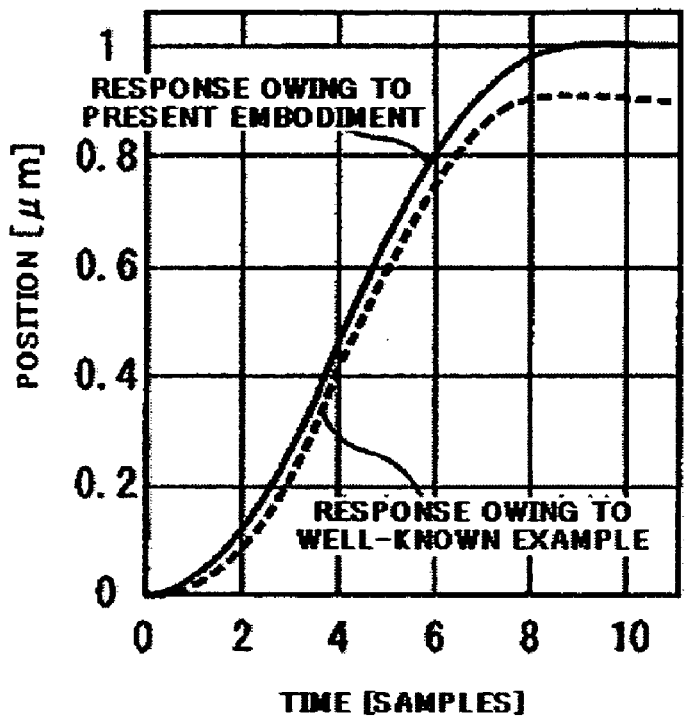
FIG. 5B is a diagram showing the time-historical response when feedforward inputs are applied to rigid-body models discretized by zero-order hold in the present embodiment and well-known technique.

The results of comparisons between the present embodiment and the well-known technique are described. In FIGS. 5A and 5B, a feedforward input according to the present embodiment and a well-known feedforward input are compared in a case using a polynominal formula of the fourth order. In the well-known feedforward input, the characteristics of the zero-order hold are not taken into consideration when the polynominal formula is derived. Therefore, it is assumed that the feedforward input at the instant of n samples uses the midpoint value between the fourth-order polynominal formula output at the instant of the n samples and the fourth-order polynominal formula output at the instant of (n−1) samples. FIG. 5A shows an acceleration signal given as a feedforward input. FIG. 5B shows a time-historical response when a feedforward input is applied to a rigid-body model discretized by a zero-order hold. Here, the sampling time is set to 30 μs, the target movement distance is set to 1 μm, and the target seek time is set to 10 samples (300 μs). The response according to the present embodiment is indicated by the solid line, while the response according to the well-known method is indicated by the broken line. It can be seen from FIG. 5B that in the well-known method where the characteristics of the zero-order hold are not taken into consideration when a polynomial formula is derived, the rigid-body model does not reach the target value because of discretization error due to the zero-order hold. On the other hand, in the method according to the present embodiment, the characteristics of the zero-order hold are taken into account when a polynominal formula is derived. Therefore, it can be seen that the rigid-body model reaches the target value without error.

Figure 6:
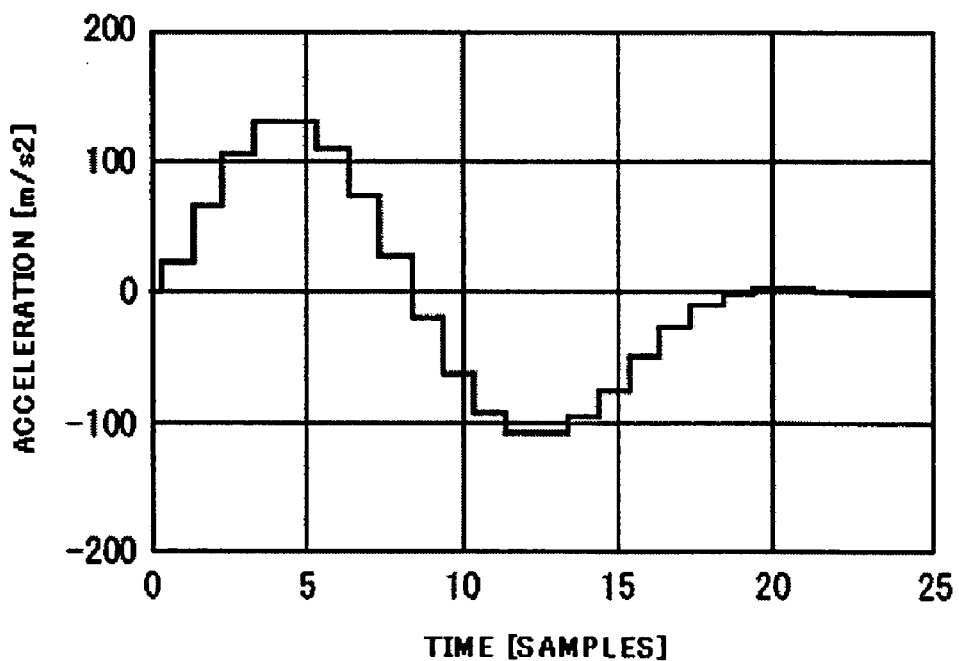
FIG. 6 is a diagram showing the time-historical response of a feedforward input of the present embodiment.
Figure 7:
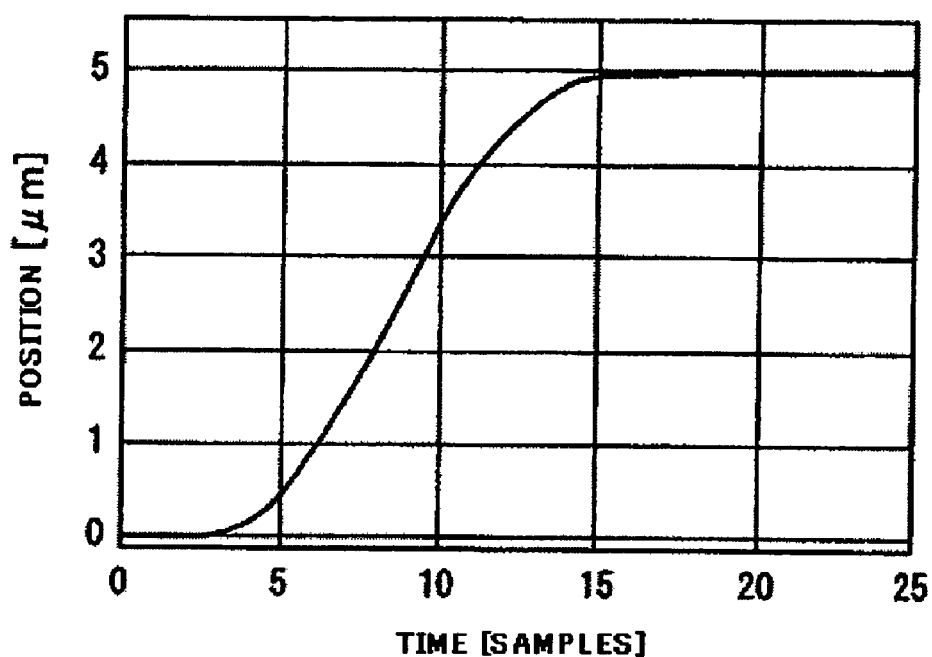
FIG. 7 is a diagram showing the time-historical response of a head position signal p of the present embodiment.
Figure 8:
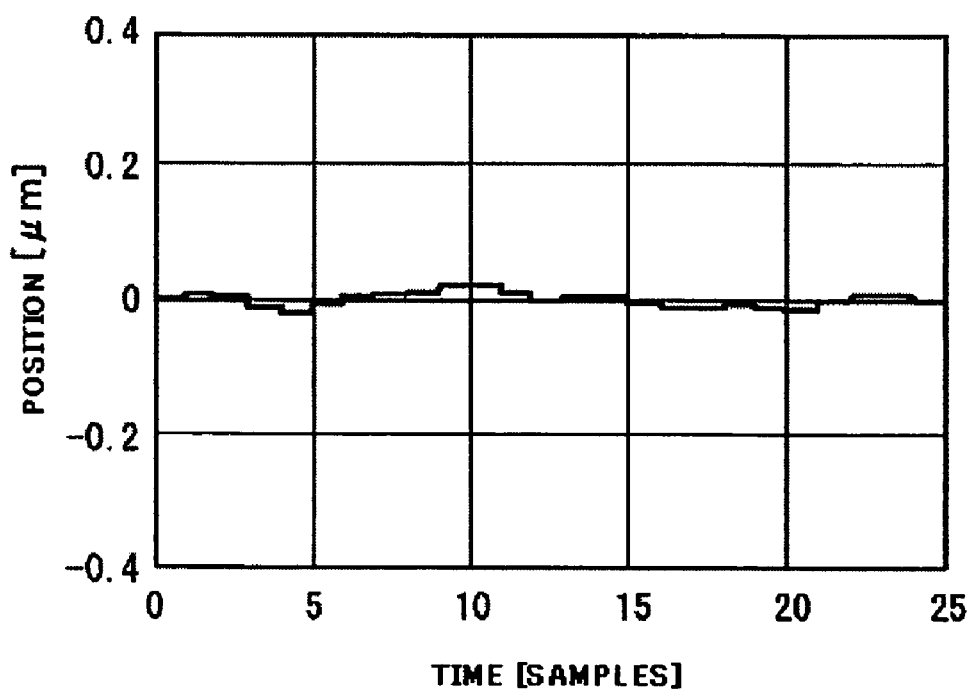
FIG. 8 is a diagram showing the time-historical response of tracking error of the present embodiment.

The results of application of the present embodiment to a seek control system are described. We now discuss a case in which the distance to a target track Ref is 5 μm and the target seek time is 20 samples, using a controlled object for which a sampling time of 30 μs is used. A sixth-order Eq. (11) is used as facc. With respect to the coefficients shown in Eq. (15) of an additive error model and in Eq. (16) of a multiplicative error model, κ is set to −1, ζ is set to 0.3, ωn is set to 39000 rad, and Td is set to 10 μs, taking account of the characteristics of the controlled object. The time-historical response of the feedforward input is shown in FIG. 6. The time-historical response of the head position signal p is shown in FIG. 7. The time-historical response of the tracking error is shown in FIG. 8. In the seek control system according to the present embodiment, the actual head position follows a target model output with good accuracy. It can be seen that a good seek operation in which residual vibrations such as transient response or the like hardly exist is realized.

In the present embodiment, the system uses the time from the start of a seek to the end of the seek. Only an arbitrary interval can be applied. In such a case, it is necessary to set boundary conditions when facc is derived according to an assumed operation.

In the present embodiment, the system uses the head position as an amount of control. It may also be the head velocity. In this case, the outputs from the rigid-body model and additive error model are velocities. It follows that a velocity feedback output using a velocity controller instead of a position control system is added to a feedforward input and applied to the controlled object.

In the present embodiment, the target position is calculated from a model. The position can also be derived using a polynominal formula. In such a case, the output from the rigid-body model within the reference model is replaced by the output of Eq. (4).

In the method of the aforementioned well-known example, target velocity and target position are derived by time integration of a target acceleration. Therefore, discretization error is produced due to zero-order hold. The present embodiment is a magnetic disk drive that derives the coefficients of a polynominal formula used as a target acceleration from boundary conditions taking account of the characteristics of the zero-order hold.

By using the present embodiment, a target acceleration not affected by discretization error due to zero-order hold can be realized, as well as a target velocity and a target position corresponding to the acceleration, by a polynominal formula of a time function. As a result, in a seek system according to the present embodiment, a feedforward input that brings the target value into agreement with the observed amount at every sample can be realized even in a sampled value control system where the observed amount and control input are identical in sampling period.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive for moving a magnetic head to a target position, the head performing at least one of recording and playback to and from a magnetic recording medium, wherein said magnetic disk drive has a seek control system in which a feedforward input is calculated with a polynomial formula of a time function, and wherein coefficients of said polynomial formula have been derived from boundary conditions including characteristics of a zero-order hold.

2. A magnetic disk drive set forth in claim 1, wherein said seek control system has a control portion configured to calculate a control signal for positioning said magnetic head in position relative to a motor for driving said magnetic head based on a head position signal obtained by digitizing a present position of said magnetic head and based on a target track signal providing a target to which said magnetic head is to be moved and for outputting the control signal.

3. A magnetic disk drive set forth in claim 2, wherein said control portion has a reference model that outputs a model based on said feedforward input.

4. A magnetic disk drive set forth in claim 2, wherein said control portion has an acceleration polynomial formula for outputting the feedforward input based on said target track signal, a reference model for outputting a model based on the feedforward input, and a position controller configured to decrease a deviation based on a tracking error that is the deviation between said outputted model and said head position signal and to output a position feedback input.

5. A magnetic disk drive set forth in claim 4, wherein said reference model has characteristics containing a rigid-body model and modelization error existing between said magnetic head and said rigid-body model.

6. A magnetic disk drive for moving a magnetic head to a target position, the head performing at least one of recording and playback to and from a magnetic recording medium, wherein said magnetic disk drive has a seek control system in which an instructed acceleration value given as a feedforward input is calculated with a polynomial formula u [n] of the number of samples n from the start of a seek, and wherein the following holds for position p, velocity v, and input u:

u [N]=0,v [N]=0,and p [N]=Pt regarding the following Eq. (3) and a defined v [n] and regarding the following Eq. (4) and a defined p [n]:

$$v[n] = \tau \sum_{i=0}^{n-1} u[i] + v[0] \quad (3)$$

$$p[n] = \frac{1}{2}\tau^2 \sum_{i=0}^{n-1} u[i] + \tau \sum_{i=0}^{n-1} v[i] + p[0] \quad (4)$$

where N is the number of samples from the start of the seek to completion of the seek, $P_t$ (in meters) is a target movement distance, and $\tau$ (in seconds) is a sampling time.

7. A magnetic disk drive set forth in claim 6, wherein said seek control system has a control portion configured to calculate a control signal for positioning said magnetic head in position relative to a motor for driving said magnetic head based on a head position signal obtained by digitizing a present position of said magnetic head and based on a target track signal providing a target to which said magnetic head is to be moved and for outputting the control signal.

8. A magnetic disk drive set forth in claim 7, wherein said control portion has a reference model that outputs a model based on said feedforward input.

9. A magnetic disk drive for moving a magnetic head to a target position, the head performing at least one of recording and playback to and from a magnetic recording medium, wherein said magnetic disk drive has a seek control system in which a feedforward input is calculated with a polynomial formula facc of the number of samples n from the start of a seek, and wherein where the number of samples from the start of the seek to the completion of the seek is set to N, the target movement distance is set to $P_t$ (in meters), the sampling time is set to $\tau$ (in seconds), and boundary conditions for position p, velocity v, and input u are given by the following Eq. (6), said polynomial formula facc is the following Eq. (7):

$$p[0] = 0, v[0] = 0, u[0] = 0, \quad (6)$$

$$p[N] = P_t, v[N] = 0, u[N] = 0, u'[N] = 0$$

$$facc = -\frac{60n(n-N)^2(5nN - 2(1+N^2))P_t}{(4-N^2-4N^4+N^6)\tau^2}. \quad (7)$$

10. A magnetic disk drive set forth in claim 9, wherein said seek control system has a control portion configured to calculate a control signal for positioning said magnetic head in position relative to a motor for driving said magnetic head based on a head position signal obtained by digitizing a present position of said magnetic head and based on a target track signal providing a target to which said magnetic head is to be moved and for outputting the control signal.

11. A magnetic disk drive set forth in claim 10, wherein said control portion has a reference model that outputs a model based on said feedforward input.

12. A magnetic disk drive for moving a magnetic head to a target position, the head performing at least one of recording and playback to and from a magnetic recording medium, wherein said magnetic disk drive has a seek control system in which a feedforward input is calculated with a polynomial formula facc of the number of samples n from the start of a seek, and wherein where the number of samples from the start of the seek to the completion of the seek is set to N, the target movement distance is set to $P_t$ (in meters), the sampling time is set to $\tau$ (in seconds), and boundary conditions for position p, velocity v, and input u are given by the following Eq. (8), said polynomial formula facc is the following Eq. (9):

$$p[0] = 0, v[0] = 0, u[0] = 0, u'[0] = 0, \quad (8)$$

$$p[N] = P_t, v[N] = 0, u[N] = 0, u'[N] = 0$$

$$facc = -\frac{420 n^2(n-N)^2(2n-N))P_t}{N(20 - 21N^2 + N^6)\tau^2}. \quad (9)$$

13. A magnetic disk drive set forth in claim 12, wherein said seek control system has a control portion configured to calculate a control signal for positioning said magnetic head in position relative to a motor for driving said magnetic head based on a head position signal obtained by digitizing a present position of said magnetic head and based on a target track signal providing a target to which said magnetic head is to be moved and for outputting the control signal.

14. A magnetic disk drive set forth in claim 13, wherein said control portion has a reference model that outputs a model based on said feedforward input.

15. A magnetic disk drive for moving a magnetic head to a target position, the head performing at least one of recording and playback to and from a magnetic recording medium, wherein said magnetic disk drive has a seek control system in which a feedforward input is calculated with a polynomial formula facc of the number of samples n from the start of a seek, and wherein where the number of samples from the start of the seek to the completion of the seek is set to N, the target movement distance is set to $P_t$ (in meters), the sampling time is set to $\tau$ (in seconds), and boundary conditions for position p, velocity v, and input u are given by the following Eq. (10), said polynomial formula facc is the following Eq. (11):

$$p[0] = 0, v[0] = 0, u[0] = 0, u'[0] = 0, \quad (10)$$

$$p[N] = P_t, v[N] = 0, u[N] = 0, u'[N] = 0, u''[N] = 0$$

$$facc = -\frac{840 n^2(n-N)^3(-10 + (7n-3N)N(1+N^2))P_t}{N(N^2-4)(N^2-1)(N^2+5)(10+3(N^2+N^4))\tau^2}. \quad (11)$$

16. A magnetic disk drive set forth in claim 15, wherein said seek control system has a control portion configured to calculate a control signal for positioning said magnetic head in position relative to a motor for driving said magnetic head based on a head position signal obtained by digitizing a present position of said magnetic head and based on a target track signal providing a target to which said magnetic head is to be moved and for outputting the control signal.

17. A magnetic disk drive set forth in claim 16, wherein said control portion has a reference model that outputs a model based on said feedforward input.

18. A magnetic disk drive for moving a magnetic head to a target position, the head performing at least one of recording and playback to and from a magnetic recording medium, wherein said magnetic disk drive has a seek control system in which a feedforward input is calculated with a polynomial formula facc of the number of samples n from the start of a seek, and wherein where the number of samples from the start of the seek to the completion of the seek is set to N, the target movement distance is set to $P_t$ (in meters), the sampling time is set to $\tau$ (in seconds), and boundary conditions for position p, velocity v, and input u are given by the following Eq. (12), said polynomial formula facc is the following Eq. (13):

$$p[0] = 0, v[0] = 0, u[0] = 0, u'[0] = 0, u''[N] = 0 \quad (12)$$

$$p[N] = P_t, v[N] = 0, u[N] = 0, u'[N] = 0, u''[N] = 0$$

$$facc = \frac{2520 n^3 (n-N)^3 (2n-N) P_t}{N(168 - 190N^2 + 21N^4 + N^8)\tau^2}. \quad (13)$$

19. A magnetic disk drive set forth in claim 18, wherein said seek control system has a control portion configured to calculate a control signal for positioning said magnetic head in position relative to a motor for driving said magnetic head based on a head position signal obtained by digitizing a present position of said magnetic head and based on a target track signal providing a target to which said magnetic head is to be moved and for outputting the control signal.

20. A magnetic disk drive set forth in claim 19, wherein said control portion has a reference model that outputs a model based on said feedforward input.

* * * * *